Aug. 18, 1970     W. A. MILLER ET AL     3,524,533

VIBRATORY CONVEYORS

Filed Feb. 29, 1968     2 Sheets-Sheet 1

INVENTORS
WILLIAM A. MILLER
ROMAN J. PIZZANO
BY
ATTORNEY

United States Patent Office 3,524,533
Patented Aug. 18, 1970

3,524,533
VIBRATORY CONVEYORS
William A. Miller, Parsippany, and Roman J. Pizzano, Caldwell, N.J., assignors to Allied Chemical Corporation, New York, N.Y., a corporation of New York
Filed Feb. 29, 1968, Ser. No. 709,438
Int. Cl. B65g 27/00
U.S. Cl. 198—220                                    7 Claims

ABSTRACT OF THE DISCLOSURE

Agglomeration of finely divided particulate material while being conveyed in vibratory conveyors is prevented in vibrating conveyors having troughs equipped with resilient agitators affixed to the trough and extending into and within the bed of the material being conveyed, so that these agitators vibrate independently relative to the conveyor trough within the material being conveyed in response to vibrating movement of the conveyor trough to agitate the material being conveyed.

BACKGROUND OF THE INVENTION

This invention relates generally to material handling devices of the vibratory conveyor and vibratory bowl feeder type suitable for handling finely divided particulate material, and particularly to an improvement in such material handling devices to reduce or eliminate agglomeration of particulate material conveyed therein. As used herein, the terms "conveyor" and "feeder" are synonymous.

Vibratory conveyors of the type wherein the material to be conveyed is made to flow along a pre-determined path on a substantially horizontal or slightly inclined conveyor surface responsive to vibratory movements of that surface generally allow delivery of the material being conveyed at a uniform, controllable rate. Vibratory conveyors find wide use in applications where uniformity and controllability of feed rates are important considerations, such as, for example, in feeding finely divided particulate material to automatic scales, mills, and the like. Some finely divided materials, however, have a tendency to agglomerate when subjected to vibrations of vibratory conveyors. When such agglomeration takes place, maintenance of uniform feed rates becomes impossible. This agglomeration, in severe cases, also renders the material being conveyed unsuitable for further processing or use. Finely divided polymer materials, such as for example finely divided polytetrafluoroethylene, have a pronounced tendency to agglomerate into lumps or balls when subjected to the vibrations of a vibratory conveyor, particularly, but not exclusively, when these materials contain small amounts of water.

Accordingly, it is an object of the present invention to provide means for preventing agglomeration of finely divided particulate material in vibratory conveyors.

It is another object of the present invention to provide an improvement in vibratory conveyors which allows delivery of finely divided particulate matreial at a uniform and controllable rate.

It is a further object of the present invention to provide an improvement in vibratory conveyors which comprises means for preventing agglomeration of finely divided particulate polymer material, particularly finely divided polytetrafluoroethylene, so that these materials may be conveyed at a uniform and controllable rate.

It is yet another object of the present invention to provide an improved process for conveying finely divided particulate material at a uniform and controllable rate wherein agglomeration of the material being conveyed is prevented.

Further objects will be apparent from the following description.

SUMMARY OF THE INVENTION

With these objects in view, the invention consists of the manipulative steps, and of the features of construction, combination of elements and arrangement of parts as hereinafter illustrated and described.

Briefly, we have discovered that agglomeration of finely divided particulate material being conveyed in vibratory conveyors is substantially reduced or eliminated by subjecting these materials while being conveyed to agitation by vibrating agitators disposed within the material being conveyed, which agitators vibrate responsive to vibrating action of the conveyor trough. This may be accomplished by use of vibratory conveyor troughs provided with one or more resilient agitator fingers affixed to the trough and extending into the bed of the finely divided particulate material being conveyed therein, these agitator fingers being adapted to vibrate independently relative to the conveyor trough within the material being conveyed, the vibrations of the agitator fingers being caused by the vibratory movement of the conveyor trough to which they are attached, thereby agitating the particulate material and preventing agglomeration thereof.

GENERAL DESCRIPTION OF THE INVENTION

Figure 1:
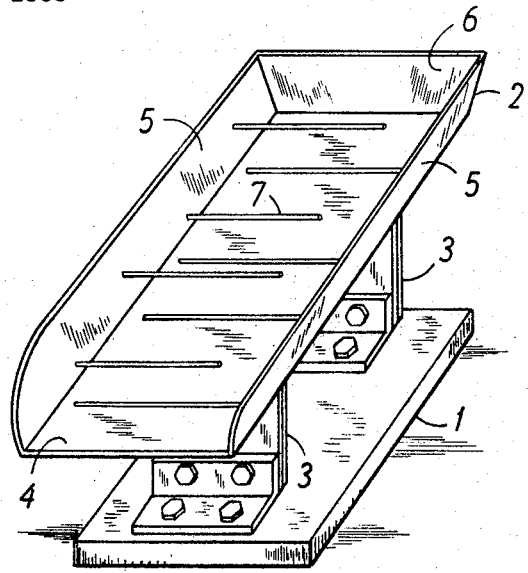
FIG. 1 is a perspective view of one type of vibratory conveyor equipped with agitator fingers in accordance with the present invention.

In accordance with the present invention, agglomeration of finely divided particulate material while being conveyed in vibratory conveyors is prevented by subjecting the material, while being so conveyed, to agitation by vibrating agitators disposed within the material being conveyed, which agitators vibrate responsive to vibrating action of the conveyor trough. This may suitably, but not exclusively, be accomplished by use of the improved apparatus in accordance with the present invention herein described.

The improved apparatus of the present invention comprises vibrator conveyor troughs equipped with agitator fingers which are slender pieces of stiff yet resiliently flexible material. One end of these agitator fingers is affixed to the conveyor trough. The other end is free, unsupported and adapted to extend into the bed of the finely divided particulate material being conveyed in the conveyor trough to which these agitator fingers are attached. These agitator fingers, as affixed to the conveyor trough, must have resiliently sufficient so that they, when flexed about their longitudinal axis to an extent not exceeding their elastic limits, upon sudden release of the flexing force will freely vibrate substantially as a whole in regular oscillations of substantially constant frequency but gradually diminishing amplitude about their position of rest. These agitator fingers must further have resiliency sufficient so that they, in response to vibratory movement of the conveyor trough to which they are affixed, will vibrate independently as a unit substantially along their entire length relative to the conveyor trough about their position of rest, and will not merely be set into vibrations sympathetic with, hence stationary with respect to, the conveyor trough. On the other hand, these agitator fingers must be stiff enough to retain their given shape and not to be permanently deformed by the material being conveyed. Stiff, non-resilient rods affixed to the conveyor trough to extend into the material being conveyed which only vibrate sympathetically with, but do not vibrate independently relative to the conveyor trough, merely tend to impede the flow of the material being conveyed, but do not prevent its agglomeration. Agitator fingers which lack stiffness so that they are permanently deformed by the material being conveyed do not provide agitation sufficient to substantially prevent agglomeration of the material being conveyed.

Suitable degrees of resiliency of the vibrator fingers are obtained by proper choice of their length to diameter ratio. When using round stainless steel wire for the construction of these agitator fingers we have found that suitable stiffness and resiliency are obtained when using a length to diameter ratio of between about 50:1 to about 200:1, preferably between about 75:1 to about 150:1. When other materials of construction are used, suitable length to diameter ratios will generally lie between about 50:1 and about 200:1. The optimum length to diameter ratio for the various suitable materials of construction are readily determined by experiment.

The agitator fingers in accordance with the present invention may be constructed of any suitable resilient material, as metals, such as steel, particularly spring steel, stainless steel, brass, aluminum, and the like; wood; plastics; hard rubber; composition materials; and others. They may have any desired cross-section, such as, for example, a round, square, rectangular, oval, star-shaped, or drop-shaped cross-section. Cross-sectional shapes which offer relatively low resistance to flow of the material being conveyed, such as round, oval, and drop-shaped cross-sections, are preferred.

The shape of the agitator fingers is not critical; they may be of any desired shape, such as straight, zig-zag, spiral, helical, or curved shape. They may be formed to generally conform to the shape of the conveyor trough to which they are affixed, and they may be shaped to extend into any portion of the material being conveyed. Exemplary suitable shapes are illustrated by the annexed drawings.

While these agitator fingers will exert their beneficial effect as long as they extend into the material being conveyed to agitate the material in contact therewith or in proximity thereto, and thereby prevent agglomeration of the material so agitated, it will generally be desirable to subject a substantial proportion of the material being conveyed to their agitating action. Hence the number of agitator fingers employed, as well as their location, configuration and spacing are preferably so chosen or designed as to subject a substantial proportion of the material being conveyed to the agitating action of the agitator fingers of the present invention.

The agitator fingers may be affixed to any suitable portion of the conveyor trough. However, to minimize hold up of the material being conveyed, these agitator fingers are preferably not affixed to the bottom of the conveyor trough. The agitator fingers in accordance with the present invention are suitable for use in vibrator conveyor troughs of any form and shape. The word "conveyor trough," as used herein, refers to any type of enclosure suitable for use in conveying particulate material by vibrating movement thereof, of any suitable shape and dimension, and includes, but is not limited to, generally rectangular conveyor troughs having a flat or curved bottom, and bowl-shaped conveyor troughs.

DESCRIPTION OF THE PREFERRED EMBODIMENTS

Figures 2, 4:
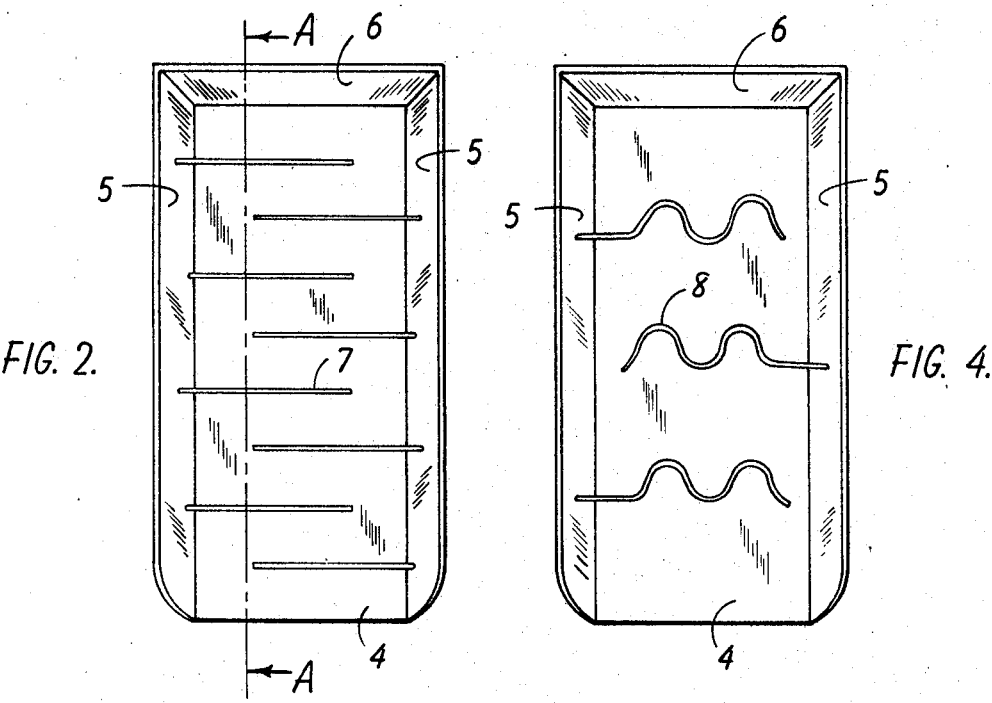
FIG. 2 is a plan view of the conveyor trough of the vibratory conveyor shown in FIG. 1.
FIG. 4 is a plan view of a conveyor trough of the type shown in FIG. 1 illustrating an alternate configuration of the agitator fingers.
Figure 3:
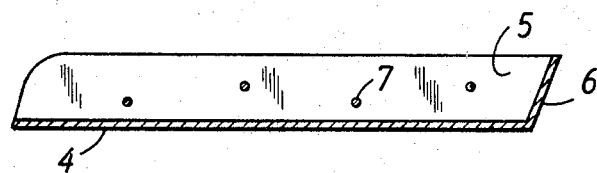
FIG. 3 is a cross-sectional view of the conveyor trough of FIG. 2 taken along the line A—A of FIG. 2.

Referring to the drawings in more detail, there is shown in FIG. 1 a vibratory conveyor of conventional construction having a base 1, a conveyor trough 2, and resilient conveyor trough support means 3. The vibratory motor actuating conveyor trough 2 is hidden from view by conveyor trough 2. Conveyor trough 2 consists of a flat bottom plate 4, a pair of opposed sidewalls 5, and a backwall 6. Conveyor trough 2 is equipped with a plurality of agitator fingers 7 which, in the embodiment of the present invention illustrated by FIG. 1, are slender, resilient pieces of straight metal wire which are affixed to the inner surface of the sidewalls 5 of conveyor trough 2 at points varying in distance from flat bottom plate 4, and extend across flat bottom plate 4 of conveyor trough 2 parallel to the surface of flat bottom plate 4 at right angles to the longitudinal axis of conveyor trough 2. Agitator fingers 7 are positioned in approximately equally spaced staggered arrangement alternately affixed to the opposed sidewalls 5 of conveyor trough 2 and extend beyond the longitudinal center line of conveyor trough 2 but end short of the sidewall opposite the one to which they are affixed. FIG. 2 shows a plan view of conveyor trough 2 of FIG. 1 illustrating the spacing of agitator fingers 7. FIG. 3, a cross-sectional view of conveyor trough 2 taken along line A—A in FIG. 2 shows attachment of agitator fingers 7 to the sidewall of conveyor trough 2 at points varying in distance from flat bottom plate 4.

In operation, agitator fingers 7 are submerged in the bed of the material being conveyed. Vibratory movement of conveyor trough 2 causes agitator fingers 7 to vibrate independently relative to conveyor trough 2. The vibrating agitator fingers 7 agitate the material wherein they are submerged, whereby agglomeration of that material is substantially prevented.

The particular arrangement of agitator fingers 7 shown in FIG. 1 has the purpose of assuring that substantially all of the material being conveyed will come in contact with, or will come into the vicinity of, one or more of the agitator fingers 7 to be subjected to the agitating action. Other arrangements which achieve this purpose will be readily apparent to those skilled in the art. The agitator fingers are preferably arranged to extend within the bed of the material being conveyed substantially transversely to the direction of flow of that material.

While in FIG. 1 the agitator fingers 7 are shown as straight pieces of metal wire, the agitator fingers need not be of that particular shape. FIG. 4 illustrates another form of agitator fingers which are wave shaped in a plane parallel to the surface of flat bottom plate 4 of conveyor trough 2. Other suitable shapes will readily occur to those skilled in the art.

Figure 5:
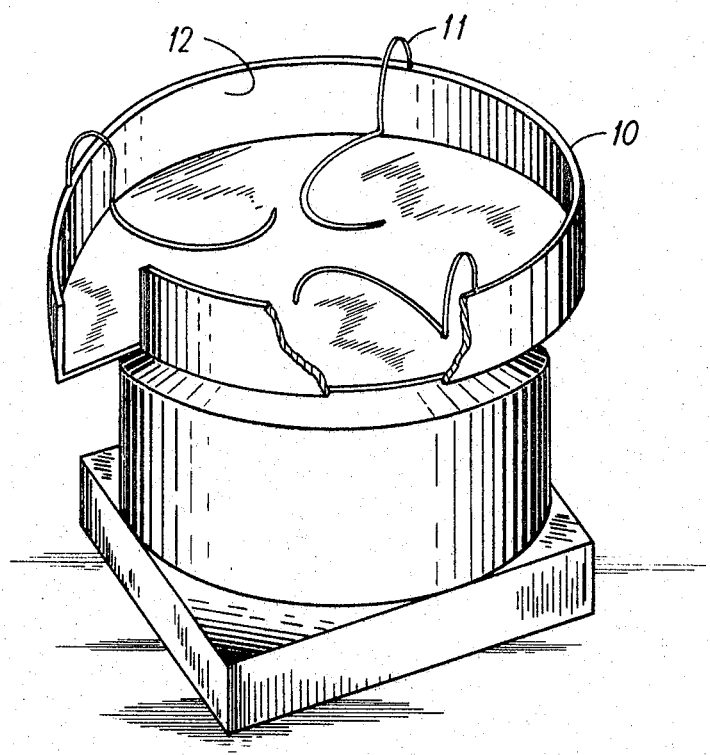
FIG. 5 is a perspective view of another type of vibratory conveyor equipped with agitator fingers in accordance with the present invention.
Figure 6:
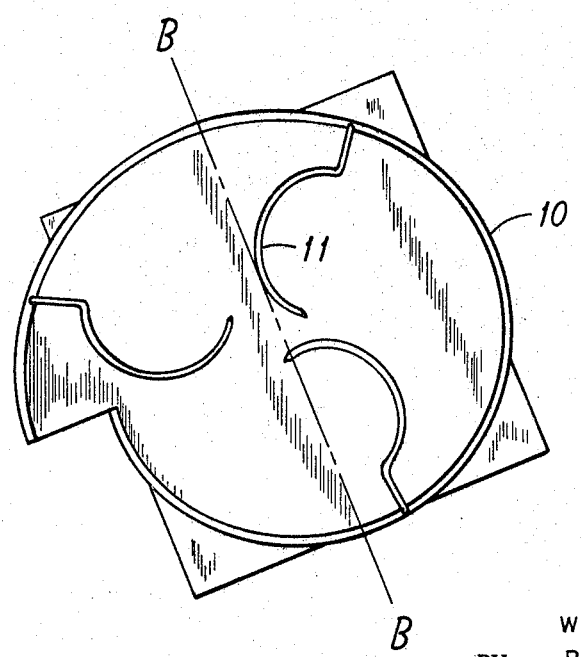
FIG. 6 is a plan view of the conveyor shown in FIG. 5; illustrate two types of vibratory conveyors equipped with agitator fingers of various configurations and arrangements.

FIG. 5 shows a vibratory feeder having a bowl-shaped conveyor trough equipped with agitator fingers in accordance with the present invention. The agitator fingers 11 are affixed to the upper rim of sidewall 12 of conveyor trough 10, are bent downwardly to extend into that space within the trough normally taken up by the material being conveyed therein, and are bent into a half circle in a plane parallel to the flat bottom of conveyor trough 10. FIG. 6, a plan view of the conveyor shown in FIG. 5, further illustrates shape and spacing of agitators 11.

EXAMPLE I

A conventional commercial "Syntron" (T.M.) vibratory bowl feeder of the type illustrated by FIG. 5 having a bowl of 16 in. diameter measured along line B—B in FIG. 6, was equipped with three agitator fingers arranged and shaped as shown in FIGS. 5 and 6. The agitator fingers were made of stainless steel wire of 0.06 in. diameter and 11 in. length. The length to diameter ratio of these agitator fingers was 180:1. The feeder bowl was vibrated at 3,600 cycles per minute. The vibrating bowl was charged with 400 grams of finely divided polytetrafluoroethylene powder having a particle size between about 15 to 100 microns, and a water content of about 10 percent by weight. The material was discharged from the bowl at a uniform rate of 60 grams/min. The material in the bowl did not agglomerate.

When the same bowl feeder without agitators was used to feed the same material under otherwise identical conditions, the polymer powder in the bowl agglomerated into balls of about ¼ inch. to about 1½ in. diameter, and the feed rate was erratic.

EXAMPLE II

When dry polytetrafluoroethylene powder having a particle size between about 30 and about 40 microns is conveyed in the vibrating bowl feeder used in Example I equipped with the agitator fingers, the material in the bowl does not agglomerate and is discharged from the bowl at a uniform rate. When the same bowl feeder without agitators is used to feed the same material under otherwise equal condition, the polymer powder in the bowl agglomerates, and the feed rate is erratic.

Equivalent results are obtained when other types of vibratory conveyors equipped with agitators in accordance with the present invention are used for conveying finely divided polytetrafluoroethylene or other polymer powders having a tendency to agglomerate.

Various embodiments, changes and modifications will be apparent, from the foregoing description and examples, to those skilled in the art. All such embodiments that fall within the true spirit of the invention are intended to be included, with the invention being limited only as set forth in the appended claims.

We claim:
1. In a vibratory conveyor for conveying particulate material having a tendency to agglomerate when subjected to vibration, the conveyor having a conveyor trough, support means for the conveyor trough, and means for vibrating the conveyor trough, the improvement comprising:
one or more stiff yet resiliently flexible agitator fingers rigidly affixed to the conveyor trough, and adapted to extend into the particulate material being conveyed, and further adapted to vibrate independently about their longitudinal axis substantially along their entire length relative to the conveyor trough within the particulate material in response to vibratory motion of the conveyor trough, thereby agitating the particulate material and preventing agglomeration thereof.

2. The improvement according to claim 1 wherein a plurality of agitator fingers are provided.

3. The improvement according to claim 2 wherein the agitator fingers are made of round resilient metal wire having a length to diameter ratio between about 50:1 and about 200:1.

4. The improvement according to claim 3 wherein the agitator fingers are affixed to the sidewalls of the conveyor trough and are adapted to extend within the particulate material being conveyed substantially transversely to the direction of flow of that material.

5. The improvement according to claim 4 wherein the metal wire has a length to diameter ratio of between about 75:1 and about 150:1.

6. The improvement according to claim 1 wherein the conveyor trough is bowl-shaped, wherein a plurality of agitator fingers are employed which are affixed to the upper rim of the circumferential sidewall of the conveyor trough and are bent downwardly to extend into the space normally filled by the material being conveyed, and are adapted to extend within the particulate material being conveyed generally transversely to the direction of flow of that material.

7. The improvement according to claim 6 wherein the agitator fingers are made of round resilient metal wire having a length to diameter ratio between about 75:1 to about 150:1.

References Cited

UNITED STATES PATENTS 448,853   3/1891   Corey.
2,311,373   2/1943   Durning.

FOREIGN PATENTS 101,348   3/1965   Denmark.

HUGO O. SCHULZ, Primary Examiner

U.S. Cl. X.R.
222—200